Nov. 22, 1955
D. E. BRIDGES ET AL
2,724,772
AIRCRAFT RADIO ANTENNAE
Filed May 7, 1951
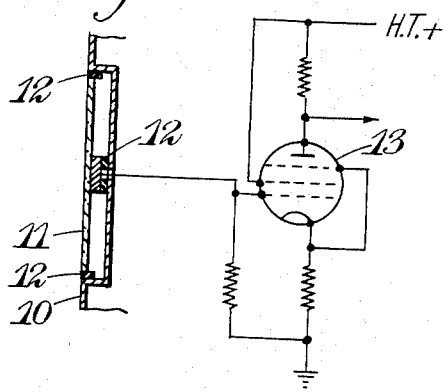
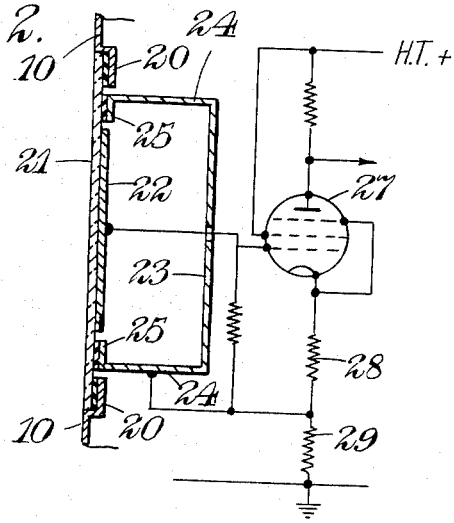
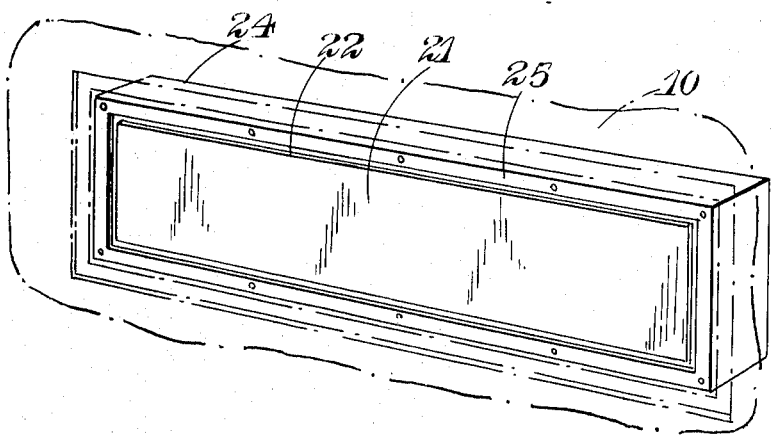
INVENTORS
D. E. BRIDGES +
W. J. O'BRIEN
By: Wilkinson + Mawhinney
ATTYS.

United States Patent Office 2,724,772
Patented Nov. 22, 1955

2,724,772

AIRCRAFT RADIO ANTENNAE

Donald Edward Bridges and William Joseph O'Brien, London, England, assignors to The Decca Record Company Limited, London, England, a British company Application May 7, 1951, Serial No. 224,868

Claims priority, application Great Britain May 10, 1950

20 Claims. (Cl. 250—33)

This invention relates to radio antennae for aircraft and more particularly relates to radio antennae having dimensions and effective height small compared with the wavelength of the radio signals. The invention has for its principal object to provide an improved construction for a suppressed antenna system i. e. a system in which the external surface lies flush with the surrounding surface of the aircraft.

According to this invention, a suppressed radio antenna for an aircraft comprises a conductive plate arranged in an opening in but electrically insulated from a conductive part of the external surface of the aircraft, the plate either lying flush with the external surface or lying inside a flush sheet of insulating material in the opening.

The plate is preferably made as large as possible and thus will in general be made only slightly smaller than the size of the opening. It will be understood that for receiving signals of relatively low frequency for which the wavelength is large compared with the dimensions of the antenna system, the strength of the signal received in an aircraft depends on the position of the antenna. Thus for receiving ground wave signals which may be considered as travelling substantially horizontally, the strength of the signal in the antenna will depend on the effective height of the antenna above or below the mean electrical height of the aircraft. Therefore an antenna constructed according to the present invention, like other types of antennae, has to be suitably positioned on the aircraft. The actual plane of the conductive plate, however, is immaterial and it may be arranged on horizontal or vertical surfaces as desired. The reason for this is that in an antenna system having dimensions small compared with the wavelength, the antenna currents produce only negigible voltage drops in the conductors of the antenna system compared with the received open circuit voltages; the self and mutual inductances of the system can therefore be neglected and the system can be regarded as a capacity network. It will also be seen therefore that this antenna system is substantially non-directional, that is to say, if one is considering signals being propagated horizontally, the antenna will receive susbtantially uniformly from all directions.

Preferably a guard or shield member is provided between the conductive plate and the conductive part of the aircraft structure. The loss in antenna output due to the capacity between the conductive plate and the guard member may then be substantially reduced by the use of a valve amplifier the input of which is connected between the conductive plate and the guard member and having a low impedance output signal the voltage of which is equal to or slightly less than the input voltage and in phase therewith. By applying this output between the guard or shield member and the aircraft body, the capacity loading of the antenna by its capacity to the guard member is reduced by a ratio which is equal to the reciprocal of the difference of the gain from unity.

Thus according to a further feature of the invention, a radio receiving system for an aircraft comprises an antenna having a guard or shield member as hereinbefore described, a valve amplifier to the input terminals of which are connected said conductive plate and said guard member, the amplifier being arranged to have a low impedance output and to provide an output voltage of amplitude slightly less than the input voltage and in phase therewith, and means for applying the amplifier output signal between the guard member and the aircraft structure.

The valve amplifier may conveniently comprise a valve arranged as a cathode follower with the conductive plate connected to the input grid and the guard member connected to the cathode.

In order to maintain the strength of the aircraft structure, metal structural members may be disposed across the opening inside the aircraft. The guard member is therefore preferably arranged to extend across the opening behind the conductive plate to shield the plate from the structural members. In this case the guard member may be made as a continuous plate disposed arranged to extend across the opening behind the conductive plate, outwardly extending portions on the guard member being arranged to form a guard ring between the edges of the conductive plate and the adjacent surface of the aircraft.

The following is a description of a member of embodiments of the invention, reference being made to the accompanying drawings in which:

Figure 1 is a diagrammatic representation of a simple form of supported antenna showing the connections to a receiver.

Figure 2 is a diagrammatic representation, similar to Figure 1 but showing another form of the antennae and receiver connections, and Figure 3 is a perspective view of the antenna system of Figure 2.

Referring to Figure 1, the outer structure 10 of the aircraft is formed with a recess in which is located a conductive plate 11 which lies flush with the outer surface of the aircraft. The plate 11 is secured in position and is insulated from the aircraft structure by means of insulating spacers 12. The plate 11 may be of any convenient shape, for example, rectangular and it may be located on any external surface of the aircraft. It will be appreciated, of course, that like other aircraft antennae for receiving relatively low frequency signals, the strength of the signal developed on the plate 11 will depend on the capacity of the plate to ground and on the effective height above or below the means electrical height of the aircraft. The plate therefore is made as large as conveniently possible and is preferably located as high above or as far below the means electrical centre of the aircraft as is possible. The actual plane of the plate, however, is immaterial for the reasons previously explained.

With the simple form of construction shown in Figure 1, the plate 11 may be connected, as shown, to the grid of an amplifier valve 13 which serves to amplify the signal voltage developed between the plate 11 and the effective earth, i. e. the main metallic body structure of the aircraft.

Another form of construction of the antenna system is represented in Figures 2 and 3. Referring to Figure 2, an opening is formed in the outer structure 10 of the aircraft, the edges of the opening being recessed as indicated at 20. A sheet 21 of insulating material, for example glass, is arranged to lie flush across the surface of the opening and is secured in the recessed edges of the opening. A conductive plate 22 is secured to the inner surface of the insulating sheet. A guard member or shield is provided between the plate 22 and the body structure of the aircraft, the guard member comprising a plate 23 extending across the opening behind the plate 22 and having outwardly extending portions 24 forming an open box-like structure, flanges 25 on the outer edges of the portions 24 forming a guard ring between the edges of the conductive plate 22 and the adjacent surface of the aircraft. This guard member is more clearly shown in Figure 3 which is a perspective view, from the exterior, of the antenna assembly, the surface of the aircraft and the opening therein being indicated by the chain dotted lines. In Figure 3, the plate 22 is illustrated as being of rectangular form and the guard member 23, 24, 25 is in the form of an open rectangular box, the opening of which fits around the plate 22. The guard member is secured to the inner surface of the insulating sheet 21 by bolts or the like.

The plate 22 is connected to the grid of valve 27 which is arranged as a cathode follower, the cathode of the valve being connected to the body structure of the aircraft through a bias resistor 28 and a cathode load resistor 29. The guard member 23, 24, 25 is connected to the junction between the bias resistor 28 and the cathode load 29 so that a signal voltage in phase with that applied to the input grid but of slightly smaller amplitude is applied to the guard member. By this arrangement, the capacity loading of the plate 22 by its capacity to the guard member is reduced by a ratio which is equal to the reciprocal of the difference of the gain from unity. Thus by using a guard member to which is applied a signal in the manner described, a considerably increased signal output may be obtained from the anode of the valve 27 as compared with the simpler arrangement of Figure 1.

It will be seen that by arranging the guard member as a box extending across the inside of the opening in the surface of the aircraft, the plate 22 is shielded from the metal structural members which may be carried across the opening inside the aircraft, such as may possibly be necessary to maintain the strength of the aircraft structure in the region of the opening in the outer surface.

We claim:

1. In an aircraft, a suppressed radio antenna for receiving low frequency radiation comprising a conductive plate having dimensions small compared with the wavelength of the radiation to be received and lying substantially flush in an opening in but electrically insulated from the external surface of the aircraft, said plate being disposed on the aircraft remotely from a point defining the electrical centre of the aircraft and having a polar pattern of relative field strength which depends on the angular position of said plate relative to said point but is independent of the angular orientation of the plane of said plate.

2. In an aircraft, a suppressed radio antenna for receiving low frequency radiation comprising a conductive plate having dimensions small compared with the wavelength of the radiation to be received and lying substantially flush in an opening in but electrically insulated from the external surface of the aircraft, said plate being disposed on the aircraft remotely from a point defining the electrical centre of the aircraft, the polarization of said antenna being independent of the angle of the surface of said plate and defined by the angle assumed by a line between said point defining the electrical centre of the aircraft and a point defining the electrical centre of said plate.

3. In an aircraft, a suppressed radio antenna for receiving low frequency radiation comprising a conductive plate having dimensions small compared with the wavelength of the radiation to be received, which plate is arranged to lie substantially flush in an external surface of the aircraft, said plate being completely insulated electrically from said surface and disposed on the aircraft remotely from a point defining the electrical centre of the aircraft, the polarization of the antenna being dependent on the location of the plate with respect to said point and independent of the angle of the surface of said plate.

4. In an aircraft, a suppressed radio antenna for receiving low frequency radiation comprising a conductive plate having dimensions small compared with the wavelength of the radiation to be received, which plate is arranged in an opening in the external surface of the aircraft at a position on the aircraft remote from a point defining the electrical centre of the aircraft, said plate being arranged to have a very high direct current resistance to said surface and lying substantially flush with said surface, the polarization of said antenna being dependent on the location of said plate with respect to said point and independent of the orientation of the surface of said plate.

5. In an aircraft, a suppressed radio antenna for receiving low frequency radiation comprising a non-circular conductive plate having dimensions small compared with the wavelength of the radiation to be received, said plate lying substantially flush in an opening in but electrically insulated from the external surface of the aircraft and being disposed on the aircraft remotely from a point defining the electrical centre of the aircraft and having a polar pattern of relative field strength which depends on the angular position of said plate relative to said point but is independent of the angular orientation of the plane of said plate.

6. In an aircraft, a suppressed radio antenna for receiving low frequency radiation comprising a conductive plate arranged in an opening in but electrically insulated from a conductive part of the external surface of the aircraft, said plate having dimensions small compared with the wavelength of the radiation to be received and being disposed remotely from a point defining the electrical centre of said conductive part of the aircraft and having a polar pattern of relative field strength which depends on the angular position of said plate relative to said point but is independent of the angular orientation of the plane of said plate, and a pair of feeding conductors for applying to a receiver the radio frequency potential developed between said plate and said conductive part of the aircraft structure, one of said feeding conductors being connected to said conductive part of the aircraft and the other being connected to said plate at a point on the plate non-uniformly distant from the edge of the plate.

7. In an aircraft, a suppressed radio antenna for receiving low frequency radiation comprising a sheet of insulating material lying flush in an opening in a conductive part of the external surface of the aircraft structure, and a conductive plate in said opening on the inner side of said insulating material, said plate having dimensions small compared with the wavelength of the radiation to be received and being electrically insulated from said conductive part of the aircraft structure and disposed on the aircraft remotely from a point defining the electrical centre of the aircraft and having a polar pattern of relative field strength which depends on the angular position of said plate relative to said point but is independent of the angular orientation of the plane of said plate.

8. In an aircraft, a suppressed radio antenna for receiving low frequency radiation comprising a conductive plate having dimensions small compared with the wavelength of the radiation to be received, said plate lying substantially flush in an opening in but electrically insulated from the external surface of the aircraft and being disposed on the aircraft remotely from the electrical centre of the aircraft and having a polar pattern of relative field strength which depends on the angular position of said plate relative to said point but is independent of the angular orientation of the plane of said plate.

9. In an aircraft, a suppressed radio antenna for receiving low frequency radiation comprising a conductive plate having dimensions small compared with the wavelength of the radiation to be received and arranged in an opening in but electrically insulated from a conductive part of the external surface of the aircraft, said plate being disposed on the aircraft remotely from a point defining the electrical centre of the aircraft, and an electrically conductive guard member between said conductive plate and said conductive part of the external surface of the aircraft, said guard member being insulated from said conductive part of the aircraft structure.

10. A suppressed radio antenna for an aircraft comprising a conductive plate arranged in an opening in but electrically insulated from a conductive part of the external surface of the aircraft, and an electrically conductive guard member between said conductive plate and said conductive part of the aircraft structure, said guard member being insulated from said conductive part of the aircraft structure.

11. A suppressed radio antenna for an aircraft for receiving low frequency radiation comprising a conductive plate having dimensions small compared with the wavelength of the radiation to be received and lying flush in an opening in but electrically insulated from a conductive part of the external surface of the aircraft, and an electrically conductive guard member between said conductive plate and said conductive part of the aircraft structure, said guard member being insulated from said conductive part of the aircraft structure.

12. A suppressed radio antenna for an aircraft for receiving low frequency radiation comprising a sheet of insulating material lying flush in an opening in a conductive part of the external surface of the aircraft structure, a conductive plate in said opening on the inner side of said insulating material and electrically insulated from said conductive part of the aircraft structure, said plate having dimensions small compared with the wavelength of the radiation to be received, and an electrically conductive guard member between said conductive plate and said conductive part of the aircraft structure, said guard member being insulated from said conductive part of the aircraft structure.

13. A suppressed radio antenna for an aircraft comprising a conductive plate arranged in an opening in but electrically insulated from a conductive part of the external surface of the aircraft structure, and an electrically conductive guard ring surrounding said plate between said plate and said conductive part of the aircraft structure, said guard member being insulated from said conductive part of the aircraft structure.

14. A suppressed radio antenna for an aircraft comprising a conductive plate arranged in an opening in but electrically insulated from a conductive part of the external surface of the aircraft, and an electrically conductive guard member between said conductive plate and said conductive part of the aircraft structure, which guard member extends across the opening behind the conductive plate said guard member being insulated from said conductive part of the aircraft structure.

15. A suppressed radio antenna for an aircraft comprising a conductive plate arranged in an opening in but electrically insulated from a conductive part of the external surface of the aircraft, and an electrically conductive guard member in the form of a continuous plate extending across the opening behind said conductive plate, which guard member has outwardly extending portions arranged to form a guard ring between the edges of said conductive plate and the adjacent surface of the aircraft, said guard member being insulated from said conductive part of the aircraft structure.

16. A radio receiving system for an aircraft comprising a conductive plate arranged in an opening in but electrically insulated from a conductive part of the external surface of the aircraft, an electrically conductive guard member between said conductive plate and said conductive part of the aircraft structure, a valve amplifier of low output impedance having two input terminals and arranged to provide an output voltage of amplitude slightly less than and in phase with the input voltage applied between said input terminals, means connecting said conductive plate and said guard member respectively to said two input terminals and means for applying the amplifier output signal between said guard member and said conductive part of the aircraft structure.

17. A radio receiving system according to claim 16 wherein said valve amplifier comprises a valve having a cathode and an input grid and arranged as a cathode follower and wherein said conductive plate and said guard member are connected respectively to said input grid and said cathode.

18. A radio receiving system for an aircraft comprising a conductive plate arranged in an opening in but electrically insulated from a conductive part of the external surface of the aircraft, an amplifier valve having a cathode, a grid and an anode, means connecting the conductive plate directly to the grid of said valve, a first resistor connecting said grid to said aircraft structure and an unbypassed resistor connecting the cathode to said aircraft structure.

19. A radio receiving system for an aircraft comprising a conductive plate arranged in an opening in but electrically insulated from a conductive part of the external surface of the aircraft, an amplifier valve having a cathode, a grid and an anode, means connecting the plate directly to the grid of said valve, a first resistor connecting said grid to said aircraft structure, an unbypassed resistor connecting the cathode to said aircraft structure, a resistive load in the anode circuit of said valve and an output circuit connected across said resistive load.

20. In an aircraft, a radio receiving system comprising a conductive plate arranged in an opening in but electrically insulated from a conductive part of the external surface of the aircraft, an amplifier valve having a cathode, a grid and an anode, a direct radio frequency connection between the plate and the grid of said valve, a first resistor connecting said grid to said aircraft structure and an unbypassed resistor connecting the cathode to said aircraft structure.

References Cited in the file of this patent

UNITED STATES PATENTS

| | | |
|---|---|---|
| 2,279,130 | Bruce | Apr. 7, 1942 |
| 2,368,663 | Kandoian | Feb. 6, 1945 |
| 2,414,266 | Lindenblad | Jan. 14, 1947 |
| 2,431,124 | Kees et al. | Nov. 18, 1947 |
| 2,457,123 | Busignies et al. | Dec. 28, 1948 |
| 2,488,419 | Lindenblad | Nov. 15, 1949 |
| 2,508,085 | Alford | May 16, 1950 |

FOREIGN PATENTS

| | | |
|---|---|---|
| 630,873 | Great Britain | Oct. 24, 1949 |
| | (U. S. No. 2,549,783) | |

OTHER REFERENCES

Pistolkors: "Theory of the Circular Diffraction Antenna," Proc. IRE, January 1948, pages 56–60.

Rhodes: "Flush Mounted Antenna for Mobile Application," published in "Electronics," March 1949.